United States Patent
Czelnik et al.

(10) Patent No.: US 9,703,393 B2
(45) Date of Patent: Jul. 11, 2017

(54) METHOD FOR INPUTTING AND IDENTIFYING A CHARACTER STRING

(71) Applicant: VOLKSWAGEN AKTIENGESELLSCHAFT, Wolfsburg (DE)

(72) Inventors: Mark Peter Czelnik, Wolfsburg (DE); Lennart Bendewald, Wolfsburg (DE); Christoph Wäller, Braunschweig (DE)

(73) Assignee: Volkswagen AG (DE)

( * ) Notice: Subject to any disclaimer, the term of this patent is extended or adjusted under 35 U.S.C. 154(b) by 53 days.

(21) Appl. No.: 14/655,501

(22) PCT Filed: Dec. 3, 2013

(86) PCT No.: PCT/EP2013/075364
§ 371 (c)(1),
(2) Date: Jun. 25, 2015

(87) PCT Pub. No.: WO2014/102041
PCT Pub. Date: Jul. 3, 2014

(65) Prior Publication Data
US 2015/0324011 A1    Nov. 12, 2015

(30) Foreign Application Priority Data

Dec. 28, 2012  (DE) .................. 10 2012 025 370
Jun. 4, 2013   (DE) .................. 10 2013 009 375

(51) Int. Cl.
*G06F 3/023* (2006.01)
*G06F 3/0488* (2013.01)

(52) U.S. Cl.
CPC .......... *G06F 3/0237* (2013.01); *G06F 3/0236* (2013.01); *G06F 3/04886* (2013.01)

(58) Field of Classification Search
CPC ................ B60K 35/00; B60K 2350/00; B60K 2350/10; B60K 2350/1004;
(Continued)

(56) References Cited

U.S. PATENT DOCUMENTS 5,724,449 A * 3/1998 Cornerford ......... G06F 3/04883
                                                    345/163
2005/0140650 A1* 6/2005 Lang ..................... G06F 3/0236
                                                    345/160
(Continued)

FOREIGN PATENT DOCUMENTS

CN       1918578 A     2/2007
CN     101424977 A     5/2009
(Continued)

OTHER PUBLICATIONS

Chaudhuri et al.; A novel multi-trie based approach for Spell-Checking; Proceedings of ICON-2010: 8th International Conference on Natural Language Processing; Dec. 8-11, 2010; URL: http://ltrc.iiit.ac.in/icon_archives/ICON2010/10Dec2010/Paper12-File40-Paper197.pdf.
(Continued)

*Primary Examiner* — Kumar Patel
*Assistant Examiner* — Amy C Onyekaba
(74) *Attorney, Agent, or Firm* — Barnes & Thornburg LLP

(57) ABSTRACT

A method for inputting and identifying a character string, in which several successively inputted user inputs for forming the character string are identified and a confidence analysis is carried out, in which each user input is compared to a number of characters and each of the compared characters is allocated a value of a confidence measure which evaluates the correlation of the user input to the characters. Character combinations are formed from the characters associated with
(Continued)

the user inputs. Global confidence measures are determined for the character combinations from the confidence measures associated with the characters. Finally, a partial amount of the character combinations is emitted in accordance with the global confidence measures. Also disclosed is a device for carrying out the method and a vehicle having the disclosed device.

15 Claims, 7 Drawing Sheets

(58) Field of Classification Search
CPC .... B60K 2350/1024; B60K 2350/1028; G06F 3/0237; G06F 3/04886; G06F 3/0236
See application file for complete search history.

(56) References Cited

U.S. PATENT DOCUMENTS

| | | | |
|---|---|---|---|
| 2005/0234722 A1* | 10/2005 | Robinson | G06K 9/222 704/257 |
| 2008/0167858 A1* | 7/2008 | Christie | G06F 3/0237 704/10 |
| 2009/0077464 A1 | 3/2009 | Goldsmith et al. | |
| 2010/0036655 A1 | 2/2010 | Cecil et al. | |
| 2011/0041056 A1* | 2/2011 | Griffin | G06F 3/0237 715/708 |
| 2011/0202493 A1 | 8/2011 | Li | |
| 2011/0202876 A1 | 8/2011 | Badger et al. | |
| 2012/0109994 A1* | 5/2012 | Ju | G06F 17/3097 707/767 |

FOREIGN PATENT DOCUMENTS

| | | |
|---|---|---|
| DE | 112007000727 T5 | 2/2009 |
| DE | 112007000848 T5 | 2/2009 |
| DE | 102008008948 A1 | 8/2009 |
| EP | 1843253 A1 | 10/2007 |
| EP | 2043001 A1 | 4/2009 |
| WO | 2008085736 A1 | 7/2008 |
| WO | 2011103337 A2 | 8/2011 |
| WO | 2011113057 A1 | 9/2011 |

OTHER PUBLICATIONS

Search Report for German Patent Application No. 10 2013 009 375.9; Aug. 1, 2013.
Search Report for International Patent Application No. PCT/EP2013/075364; Jul. 4, 2014.
Office Action for Chinese Patent Application No. 201380068834.X; Nov. 4, 2016.

* cited by examiner

FIG. 3a

| 21.1 | 22.1 |
|---|---|
|  | C |
| H | 0,9 |
| A | 0,7 |

↑ 20.1

| 21.2 | 22.2 |
|---|---|
|  | C |
| A | 0,8 |
| H | 0,7 |

↑ 20.2

| 21.3 | 22.3 |
|---|---|
|  | C |
| N | 0,9 |
| M | 0,8 |

↑ 20.3

| 21.4 | 22.4 |
|---|---|
|  | C |
| S | 0,9 |
| Z | 0,4 |

| 24.1 | 25.1 |
|---|---|
|  | C |
| H | 0,9 |
| A | 0,7 |

↑ 23.1

| 24.2 | 25.2 |
|---|---|
|  | C |
| HA | 0,72 |
| HH | 0,63 |
| AA | 0,56 |
| AH | 0,49 |

↑ 23.2

| 24.3 | 25.3 |
|---|---|
|  | C |
| HAN | 0,648 |
| HAM | 0,576 |
| HHN | 0,567 |
| HHM | 0,504 |
| AAN | 0,504 |
| AAM | 0,448 |
| AHN | 0,441 |
| AHM | 0,392 |

↑ 23.3

| 24.4 | 25.4 |
|---|---|
|  | C |
| HANS | 0,5832 |
| HAMS | 0,5184 |
| HHNS | 0,5103 |
| HHMS | 0,4536 |
| AANS | 0,4536 |
| AAMS | 0,4032 |
| AHNS | 0,3969 |
| AHMS | 0,3528 |
| HANZ | 0,2592 |
| HAMZ | 0,2304 |
| HHNZ | 0,2268 |
| HHMZ | 0,2016 |
| AANZ | 0,2016 |
| AAMZ | 0,1792 |
| AHNZ | 0,1764 |
| AHMZ | 0,1568 |

↑ 23.4

| | 21.1 | 22.1 |
|---|---|---|
| | • | C• |
| | A | 0,9 |
| | H | 0,8 |

↑ 20.1

| | 21.2 | 22.2 |
|---|---|---|
| | • | C• |
| | A | 0,8 |
| | H | 0,7 |

↑ 20.2

| | 21.3 | 22.3 |
|---|---|---|
| | • | C• |
| | N | 0,9 |
| | M | 0,8 |

↑ 20.3

| | 21.4 | 22.4 |
|---|---|---|
| | • | C• |
| | S | 0,9 |
| | Z | 0,4 |

| | 24.1 | 25.1 |
|---|---|---|
| | • | C• |
| | A | 0,9 |
| | H | 0,8 |

↑ 23.1

| | 24.2 | 25.2 |
|---|---|---|
| | • | C• |
| | AA | 0,72 |
| | AH | 0,63 |
| | HA | 0,64 |
| | HH | 0,56 |

↑ 23.2

| | 24.3 | 25.3 |
|---|---|---|
| | • | C• |
| | AAN | 0,648 |
| | AAM | 0,576 |
| | AHN | 0,567 |
| | AHM | 0,504 |
| | HAN | 0,576 |
| | HAM | 0,512 |
| | HHN | 0,504 |
| | HHM | 0,448 |

↑ 23.3

| | 24.4 | 25.4 |
|---|---|---|
| | • | C• |
| | AANS | 0,5832 |
| | HANS | 0,5184 |
| | AAMS | 0,5184 |
| | AHNS | 0,5103 |
| | HAMS | 0,4608 |
| | AHMS | 0,4536 |
| | HHNS | 0,4536 |
| | HHMS | 0,4032 |
| | AANZ | 0,2592 |
| | HANZ | 0,2304 |
| | AAMZ | 0,2304 |
| | AHNZ | 0,2268 |
| | HAMZ | 0,2048 |
| | AHMZ | 0,2016 |
| | HHNZ | 0,2016 |
| | HHMZ | 0,1792 |

↑ 23.4

FIG. 4b

METHOD FOR INPUTTING AND IDENTIFYING A CHARACTER STRING

PRIORITY CLAIM

This patent application is a U.S. National Phase of International Patent Application No. PCT/EP2013/075364, filed 3 Dec. 2013, which claims priority to German Patent Application Nos. 10 2012 025 370.2, filed 28 Dec. 2012, and 10 2013 009 375.9, filed 4 Jun. 2013, the disclosures of which are incorporated herein by reference in their entirety.

SUMMARY

Illustrative embodiments relate to a method for inputting and identifying a character string. Furthermore, illustrative embodiments relate to a device for inputting and identifying a character string.

The comparison of user inputs with database entries stored in a database is known from the technical field of search engines. Here, a user input is compared with database entries, and the relevance of each database entry is calculated by means of an algorithm, and an associated confidence measure is output which quantifies the relevance. If the search result is unambiguous, the corresponding database entry is output or a function is carried out based on it. If the search result is not unambiguous, typically, either a hit list or a system-side query is output.

Such comparisons are used, in particular, if it is assumed that recorded data are faulty, either due to incomplete or ambiguous inputs on the part of the user, or due to inaccurate recording on the system side, as is the case, for example, with speech inputs in a noisy environment or with manual inputs in an environment which is affected by vibrations. Therefore, such interactive user interfaces are increasingly used in vehicles to improve the ease of use of the numerous operating devices, for example, a navigation system, telecommunication devices, or infotainment devices.

Disclosed embodiments provide a method and a device of the kind initially specified which allow making inputs into a system without making a manual correction of the inputs which are identified by the system as possibly being faulty.

BRIEF DESCRIPTION OF THE DRAWINGS

Disclosed embodiments will now be explained with reference to the drawings.

FIG. 3a depicts an assignment of confidence measures to relevant characters;

FIG. 3b depicts character combinations and overall confidence measures of the relevant characters ascertained from FIG. 3a;

FIG. 4a depicts an additional assignment of confidence measures to relevant characters;

FIG. 4b depicts character combinations and overall confidence measures of the relevant characters ascertained from FIG. 4a;

DETAILED DESCRIPTION OF THE DISCLOSED EMBODIMENTS

Figure 1:
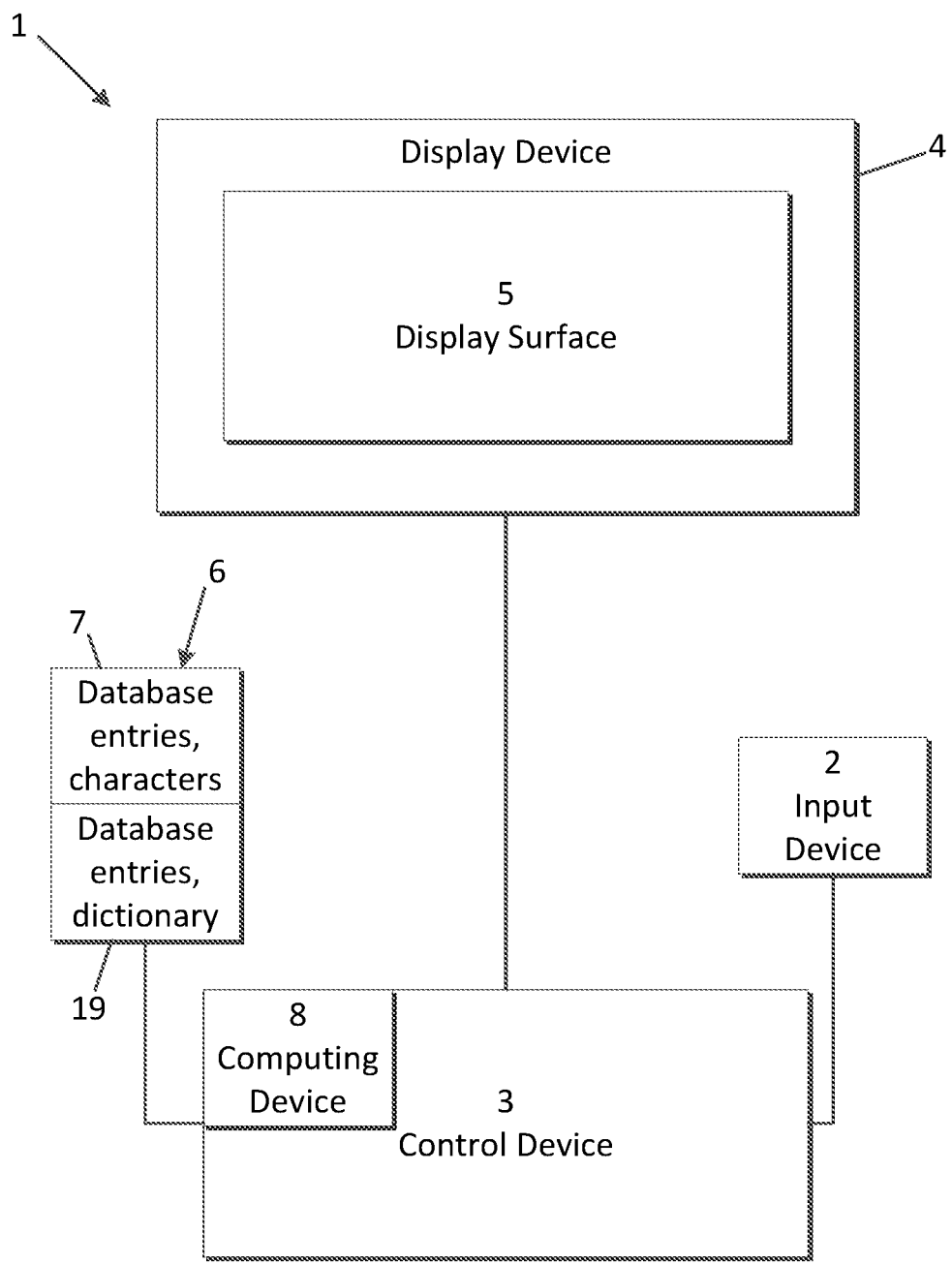
FIG. 1 schematically depicts one exemplary embodiment of the disclosed device.

In the disclosed method, multiple user inputs which are input in succession are detected to form a character string. Furthermore, a confidence analysis is carried out, in which each user input is compared with multiple characters stored in a database, and a value of a confidence measure is assigned relevant characters, which assesses the correspondence of the user input to these relevant characters. Character combinations are formed from the characters assigned to the user inputs, wherein overall confidence measures for the character combinations are ascertained from the confidence measures assigned to the characters. Furthermore, a subset of the character combinations is output as a function of the overall confidence measures. Advantageously, in the disclosed method, it is not necessary for a user to correct a faulty input.

The characters which have a similarity to the user input are considered to be relevant characters. For example, for the user input "H", in addition to the character "H", the character "A" is also considered to be relevant, while the character "O" is not considered to be relevant.

The result of the confidence analysis is the central requirement for controlling the disclosed method. When carrying out a confidence analysis, it is assumed that data detected on the system side, for example, are faulty due to incomplete or ambiguous inputs or due to inaccurate detection, as is the case, for example, for speech inputs in a noisy environment or for manual inputs in an environment which is affected by vibrations. In particular, the result of the confidence analysis in this case may be unambiguous or less unambiguous. In terms of the present disclosure, an ideally unambiguous result of the confidence analysis is if exactly one database entry is ascertained having a very high confidence measure. A less unambiguous result is when, for example, no or multiple database entries are ascertained having a very high confidence measure.

According to at least one disclosed embodiment, only those character combinations are output whose overall confidence measures lie above a certain threshold value. This is advantageous to achieve a reduction of the possible character combinations in the case of a long user input. This increases the execution speed and the clarity of the output for the user.

In particular, the threshold value is selected as a function of the number of multiple user inputs. The threshold value is thus adapted to the number of user inputs. This is in particular advantageous if the overall confidence measures decrease or increase sharply due to a certain arithmetic operation. By adapting the threshold value, it is then prevented that the number of character combinations which are output is zero.

In a different disclosed embodiment, the overall confidence measures of the character combinations are ascertained by means of multiplication of the confidence measures assigned to the relevant characters. This is particularly advantageous, since the character combinations having a low confidence measure are then disproportionately weakened. These character combinations are thus classified as particularly improbable and are no longer considered under the method. Alternatively, the overall confidence measures may also be ascertained by means of averaging over the confidence measures assigned to the relevant characters.

According to another disclosed embodiment, the subset of the character combinations is arranged in descending order according to the level of the overall confidence measures, and the character combination having the highest overall confidence measure is output first. It is thus advantageously ensured that the character combinations which have most probably been entered by the user are also output first.

In particular, the subset of the character combinations is compared with database entries. If no database entry is then present for the character combination having the highest confidence measure, this character combination is not output. The character combination having the next-highest overall confidence measure, for which a database entry is present, is output first. The database entries are, for example, entries from a dictionary. It is thus ensured that only meaningful character combinations are output to the user. This reduces the number of character combinations. Furthermore, this makes possible a "backwards correction" without the user having to make a manual correction.

According to another disclosed embodiment, the user inputs are detected by means of handwriting detection, speech detection, or keyboard input detection.

The disclosed device for inputting and identifying a character string includes an input device for inputting and detecting user inputs. Furthermore, the device includes a control device for carrying out a confidence analysis, in which comparisons may be carried out between user inputs with multiple characters stored in a database, and a value of a confidence measure may be assigned to relevant characters, which assesses the correspondence of the user input to these relevant characters. Furthermore, the control device is designed to form character combinations from the relevant characters. Overall confidence measures for the character combinations may be ascertained from the confidence measures assigned to the characters by means of a computing device. Furthermore, the device includes an output device by means of which a subset of the character combinations may be output as a function of the overall confidence measures. The device is in particular designed to carry out the disclosed method and, therefore, has all the advantages of the method.

Disclosed embodiments also relate to a vehicle including such a device.

Figure 7:
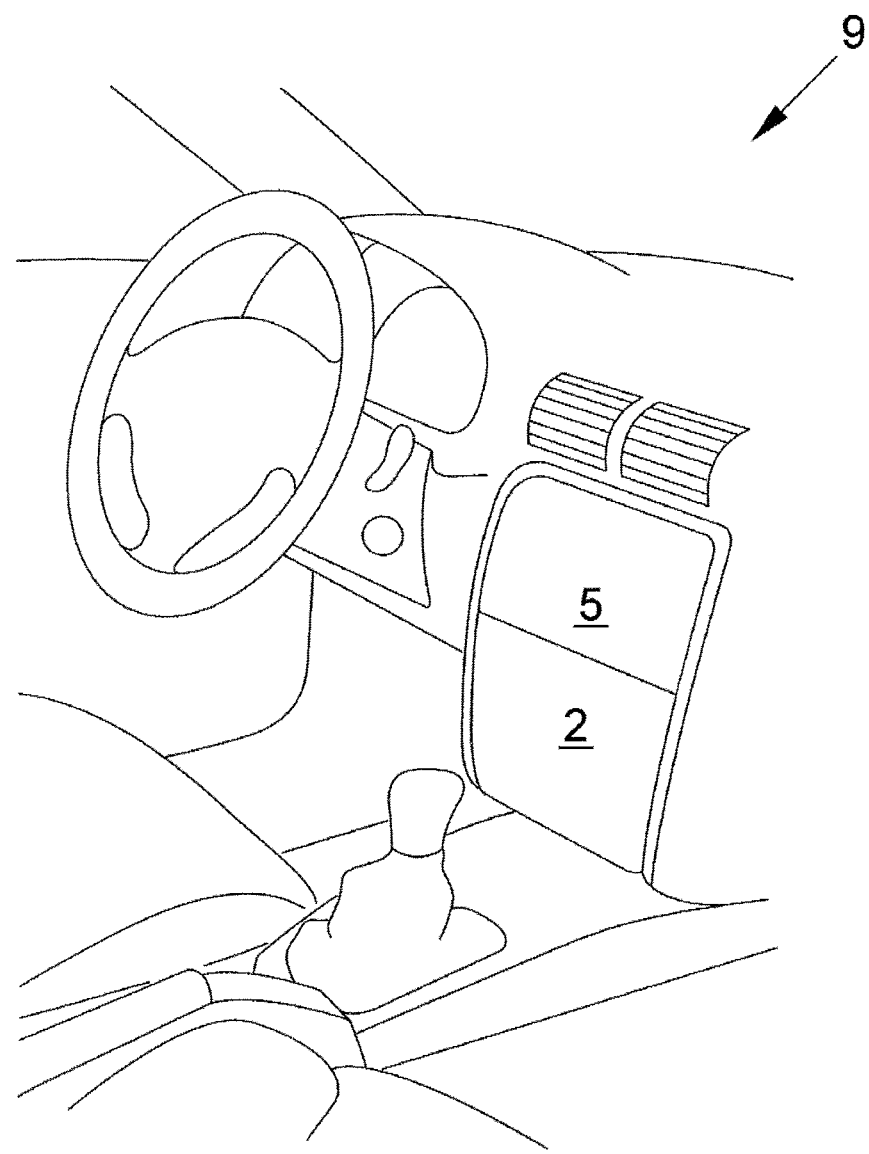
FIG. 7 depicts an arrangement of the disclosed device in a vehicle.

With reference to FIGS. 1 and 7, a first exemplary embodiment of the device 1 and an arrangement of the device 1 in a vehicle 9 are described initially.

The device 1 for inputting and identifying a character string includes an input device 2 which includes a touch-sensitive surface which is able to detect a user input. As a result, the input device 2 is able to detect a handwritten input on the part of the user. Alternatively, a field on the input device 2 may be designed as a keyboard. Therefore, the user may also make inputs by means of a keyboard. Furthermore, the input device 2 may be designed as a microphone via which speech inputs may be detected.

Furthermore, the device 1 includes a control device 3 which is coupled to the input device 2. The control device 3 is furthermore coupled to a display device 4 which includes a display surface 5 on which the user inputs are displayed. Finally, the device 1 includes a database 6 in which database entries 7 and 19 are stored. The database entries include characters 7 and entries from a dictionary 19. The database 6 is coupled to the control device 3, as are the display device 4 and the input device 2. Furthermore, a computing device 8 is integrated into the control device 3. The computing device 8 carries out comparisons of the user inputs with the database entries 7 and 19.

Figure 2:
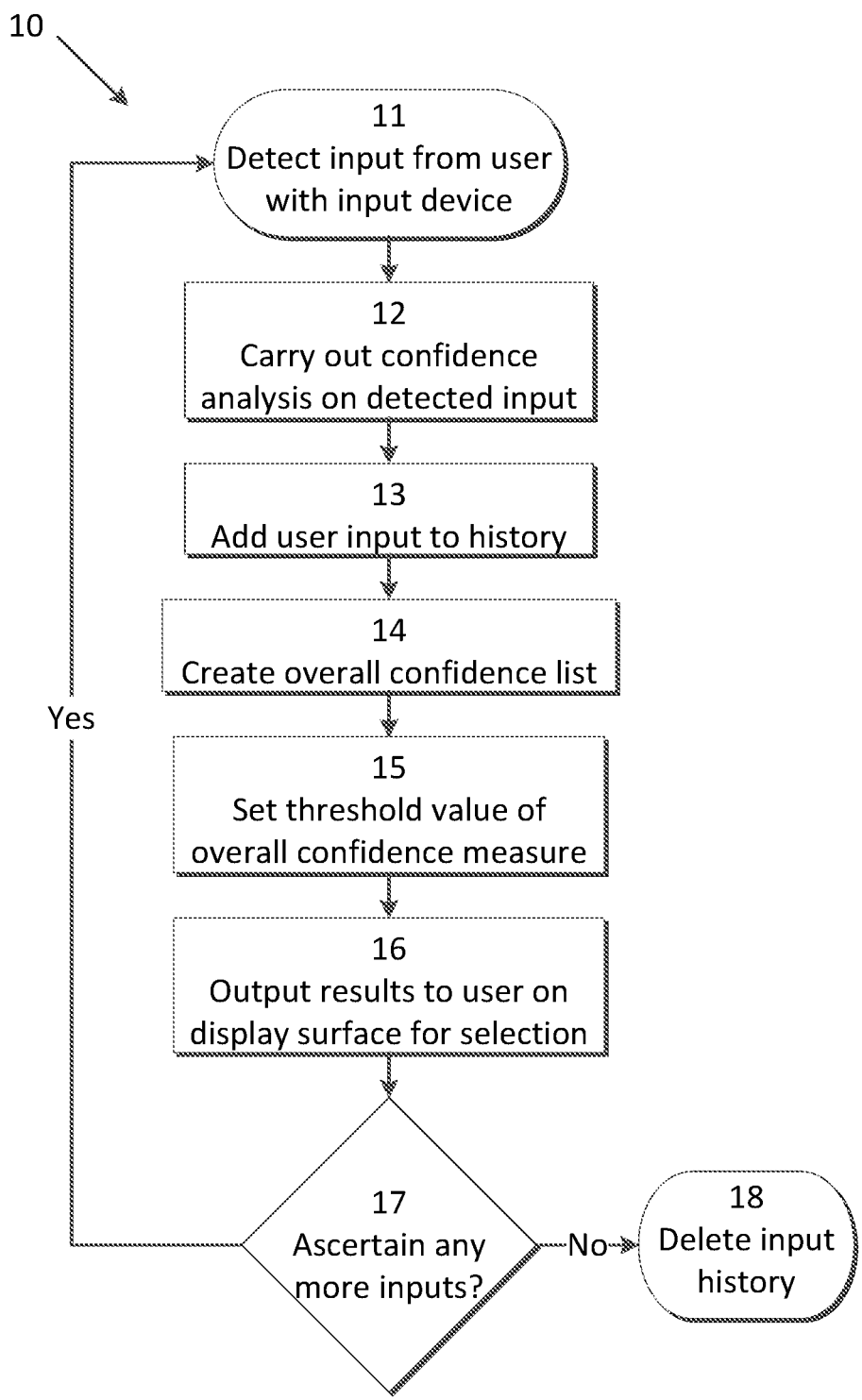
FIG. 2 depicts a flow chart for the sequence of a first exemplary embodiment of the disclosed method.

The method will be explained with reference to FIGS. 2, 3a, and 3b. The name "HANS" will be used as an example of a character string to be identified. The method may be carried out using the device 1 of FIG. 1.

In step 11 of the method 10, the input device 2 detects an input made by the user. This, for example, is the writing of the letter "H" on the touch-sensitive surface of the input device 2.

In step 12, a confidence analysis is carried out for the letter "H". In the confidence analysis, the input letter "H" in particular is compared with the characters 7 in the database 6. Deviations from the input "H" from the characters 7 are ascertained, and a confidence measure 22.1 is ascertained from them.

In FIG. 3a, a hit list 20.1 is depicted. The hit list 20.1 includes two columns, from which relevant characters 21.1 are listed in the left column and the associated calculated values of the confidence measure 22.1 are juxtaposed in the right column. The characters 21.1 are sorted in descending order of the assigned confidence measure 22.1. In the exemplary embodiment, the confidence measure C assumes values between $0 \leq C \leq 1$.

A value of 0.9 is calculated for the confidence measure 22.1 for the character "H". A value of 0.8 is calculated for the confidence measure 22.1 for the character "A". In this case, the user input is thus more likely assigned to the actually intended letter "H".

In step 13, the user input is added to a history.

In step 14, an overall confidence list 23.1 is created. Overall confidence measures 25.1 are calculated for each combination 24.1 of the relevant characters 21.1 from the values of the confidence measures 22.1 of the relevant characters 21.1. Since only a single input has been made by the user thus far, the values of the confidence measure 22.1 of the relevant characters 21.1 are assumed to be overall confidence measures 25.1.

In step 15, a threshold value of the overall confidence measure is set, for example, to C=0.7. The number of character combinations may be reduced in this manner. In the specific example, the overall confidence measures 25.1 of both character combinations 24.1 lie above the threshold value.

In step 16, the results are output to the user on the display surface 5 of the device 1 for selection.

In step 17, it is ascertained whether or not the user input has ended with the writing of the letter "H". For example, this is detected by whether or not the user makes a second input after a certain time interval has elapsed. For example, this time interval may be between 0.5 s and 2 s. If no further input is made within this time interval, the method continues at step 18. If a second user input is made within the specified time interval, the method is started from the beginning at step 11.

The user now writes an "A" on the input device 2 within the previously specified time interval. Steps 12 and 13 of the method 10 are repeated for the letter "A". Thus, a hit list 20.2 is again ascertained. Relevant characters 21.2 are listed in the left-hand column in the hit list 20.2, and the associated calculated values of the confidence measure 22.2 are provided in the right-hand column. A value for the confidence measure of 0.8 is calculated for the character "A", and a value for the confidence measure of 0.7 is calculated for the character "H". Therefore, the actually intended letter "A" is assigned to the highest confidence measure.

In step 14, a value for an overall confidence measure 25.2 is calculated from the values of the confidence measures 22.1 and 22.2. The relevant characters 21.1 and 21.2 are combined with each other. This is shown in FIG. 3b. Thus, four possible character combinations 24.2 exist for the letters "H" and "A", for which two relevant characters were ascertained in each case. The overall confidence measure 25.2 may be calculated via multiplication of the individual confidence measures 22.1 and 22.2. This has the advantage that character combinations which contain characters having a low level of confidence are generally disproportionately weakened. Alternatively, the overall confidence measure may also be formed via an averaging of the individual confidence measures. This is meaningful if a weakening of character combinations having low overall confidence measures is not desirable.

In step 15, a threshold value of the overall confidence measure is set, for example, to C=0.6. The number of relevant character combinations is reduced in this manner. Since the values of the overall confidence measures generally become smaller and smaller due to the multiplication of the individual confidence measures of the relevant characters as the number of user inputs increases, it is advantageous to adjust the threshold value to the number of user inputs. If the threshold value is in fact chosen too high in the first pass of the method when only a first user input has been made, the number of character combinations which are ultimately output is reduced to zero if the threshold value is not adjusted as the number of user inputs increases.

In step 16, the character combinations which have an overall confidence measure above the threshold value are output to the user on the display surface 5 of the device 1 for selection. In the specific example of FIG. 3b, the character combinations 23.2 "HA" and "HH" would be displayed on the display surface 5.

In step 17, it is again ascertained whether the input has ended. Since the user now makes the entries "N", the method again starts at step 11. Steps 12 and 13 of the method are carried out similarly to the inputs "H" and "A".

In step 14, overall confidence measures 25.3 of the character combinations 24.3 of the three inputs are calculated based on the values of the confidence measures 22.1, 22.2, and 22.3 of the three inputs. If two relevant characters 21.1, 21.2, and 21.3 are ascertained in each case for all three inputs, a total of eight possible character combinations 24.3 thus results.

In step 15, the threshold value of the overall confidence measure is set to a lower value, for example, C=0.5.

Then, in step 16, all character combinations 24.3 having an overall confidence measure 25.3 above the set threshold value are again displayed on the display surface 5. In the specific example of FIG. 3b, the character combinations "HAN", "HAM", "HHN", "HHM", and "AAN" are displayed on the display surface 5.

In step 17, it is again detected that the user has made a fourth input, i.e., the input "S". Steps 11, 12, and 13 of the method are carried out similarly to the inputs "H", "A", and "N".

In step 14, overall confidence measures 25.4 of the character combinations 24.4 of the four inputs are calculated based on the values of the confidence measures 21.1 to 21.4 of the four inputs. If two relevant characters 21.1 to 21.4 are ascertained in each case for all four inputs, a total of sixteen possible combinations 24.4 thus results.

In step 15, the threshold value of the confidence measure is set to C=0.4. In step 16, the character combinations "HANS", "HAMS", "HHMS", "HHMS", "AANS", and "AAMS" are then displayed one below the other for the user on the display surface 5 for selection. The character combinations 24.4 are arranged in descending order according to the level of the overall confidence measure 25.4. Alternatively, the character combination having the highest overall confidence measure 25.4 may be automatically added to the written text. The alternatives having the lowest overall confidence measure 25.4 may then be displayed to the user at another location on the display surface 5 for selection. If the user selects no alternatives, they are removed from the display surface 5 after a preset time. Alternatively, the alternatives may also be removed from the display surface 5 if the user makes the next input.

In step 17, it is now identified that no additional input by the user follows. The method is ended at step 18 by the input history being deleted.

In FIGS. 3a and 3b, it was assumed that the highest confidence measure was assigned to the detected inputs made by the user from the beginning the characters actually intended by the user. It is not possible to make this assumption in particular for Asian languages, which often contain thousands of different characters.

FIGS. 4a and 4b therefore depict an example for the calculation of the overall confidence measures 25.1 to 25.4, in which, for example, the first user input is not assigned with the highest confidence to the character actually intended by the user. In the specific example of the input "H", a higher confidence measure 22.1 is thus assigned to the character "A" than to the actually intended character "H". The remaining assignments of the input remain unchanged in comparison to FIGS. 3a and 3b.

In a conventional input identification approach, right after making the first input, the user would have to make a correction to the input to receive the desired character string. However, under the method, it is possible that the user receives the desired result without making a correction. This is possible since all or at least a subset of input combinations from the list having overall confidence measures is/are added.

Figure 5:
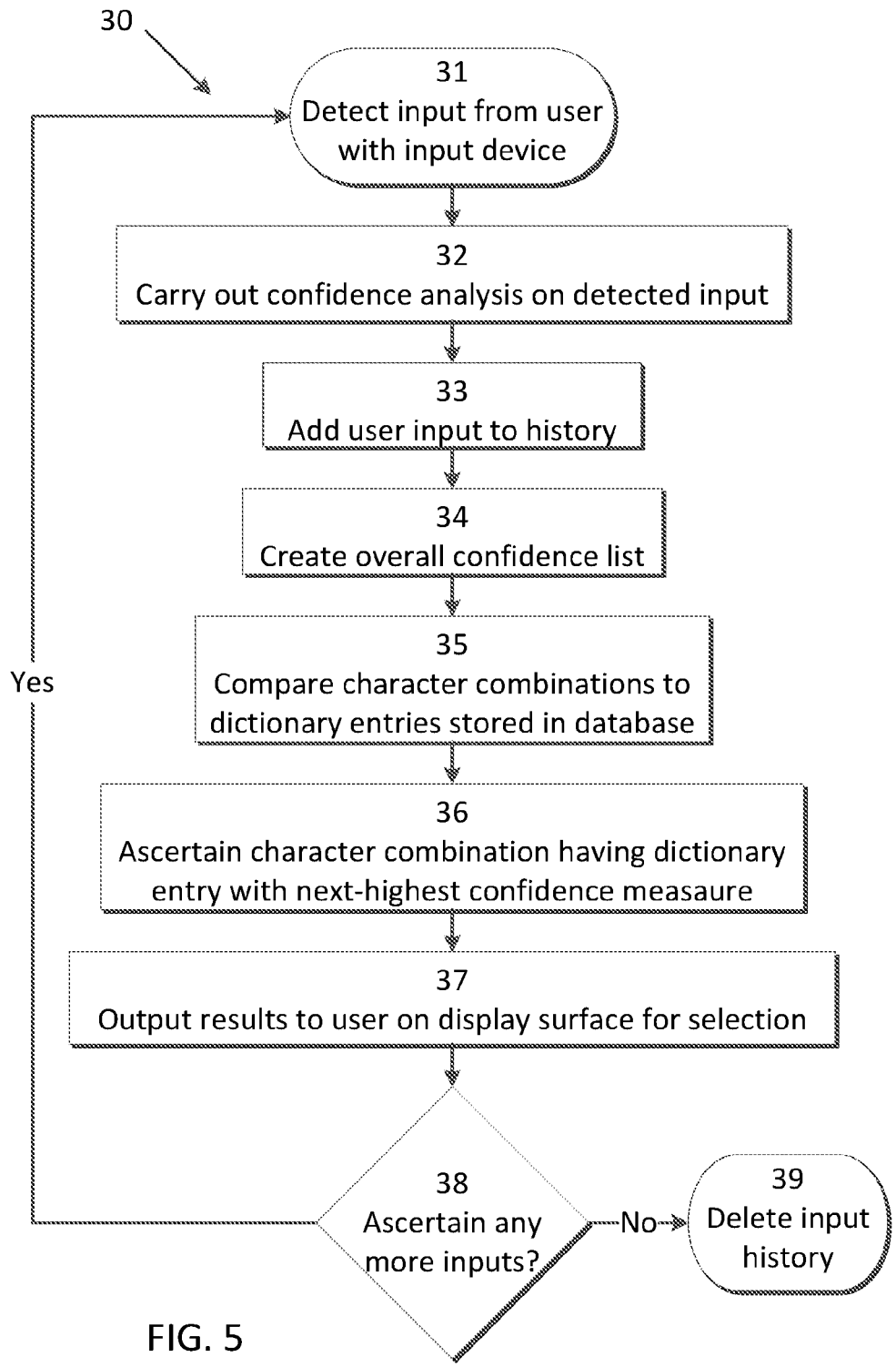
FIG. 5 depicts a flow chart for the sequence of a second exemplary embodiment of the disclosed method.

An additional exemplary embodiment of the method 30 for identifying a character string as a function of the overall confidence measures is explained with reference to FIGS. 4a, 4b, and 5.

It is still assumed that the user would like to input the character string "HANS". Steps 31 to 34 of the method 30 correspond to steps 11 to 14 of the method 10 from FIG. 2.

In step 34, as in step 14 of the method 10, the character combinations 24.1 to 24.4 are thus formed and associated overall confidence measures 25.1 to 25.4 are calculated. The situation of FIGS. 4a and 4b is assumed. The first user input "H" is thus not assigned with the highest degree of confidence to the actually intended character "H", but rather to the character "A".

In step 35, the character combinations 24.1 to 24.4 are compared with dictionary entries 19 stored in the database 6. As of the third user input "N", it is not possible to find any more dictionary entries 19 for the character combination "AAN", which has the highest value of the overall confidence measure 24.3 in the overall confidence list.

In step 36, the character combination 24.3 having the next-highest confidence measure, for which a dictionary entry 19 is present, is ascertained. In the specific example, this is the case for the combination "HAN" having the second-highest confidence measure. Simultaneously, the character combination "AAN" is deleted from the list. This means that the character combination "AAN" is no longer considered for additional user inputs.

In step 37, the character combination "HAN" is then displayed to the user on the display surface 5 as the first combination for selection. Other character combinations for which a dictionary entry 19 also exists, but which have a low confidence measure, are displayed below the character combination "HAN".

In step 38, it is then detected that the user has made an additional input. The procedure in steps 32 to 34 for the input "S" made by the user is similar to the preceding inputs.

In step 35, the character combinations 24.4 of the four user inputs are again compared with dictionary entries stored in the database 6. However, since the character combination "AAN" has already been deleted in the previous iteration of the method, the character combination "AANS" is not considered further.

In step 36, the character combination 24.3 having the next-highest overall confidence measures 25.3, for which a dictionary entry 19 is present, is ascertained. In the specific example, this is the case for the combination "HANS" having the now-highest overall confidence measure 25.3.

In step 37, first, the character combination 24.4 having the highest overall confidence measure 25.4 and a counterpart in the dictionary 19 is then displayed, i.e., "HANS". All other character combinations 24.4 having lower overall confidence measures 25.4 and a counterpart in the dictionary 19 are displayed below the character combination "HANS".

Steps 38 and 39 again correspond to steps 17 and 18 of the method 10.

This exemplary embodiment of the method has the advantage that only character strings are output to the user which have a counterpart in the dictionary. An output of a mere series of characters is thus prevented. As a result of the method 30, it advantageously results that the input is automatically corrected. Thus, the user does not have to make any manual corrections. Therefore, a "backwards correction" may be achieved.

The method steps of the methods 10 and 30 may be combined in any manner. In particular, a threshold value of the overall confidence measure 25.1 to 25.4 may also be set in the method 30, as described in method step 15 of the method 10.

Figure 6A:
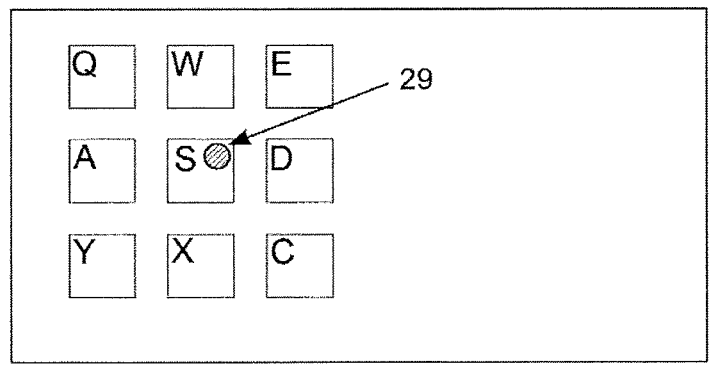
FIG. 6a depicts a section of a keyboard having a German keyboard arrangement.

The assignment of the confidence measures 22.1 to 22.4 to user inputs will be explained for a keyboard detection, with reference to FIGS. 6a to 6c:

For this purpose, a keyboard is displayed to the user on the input device 2, which the user is able to operate conveniently by simply touching the display surface 5. FIG. 6a shows a section of a keyboard having a German keyboard arrangement. A keystroke 29 is detected on the key S.

Figure 6B:
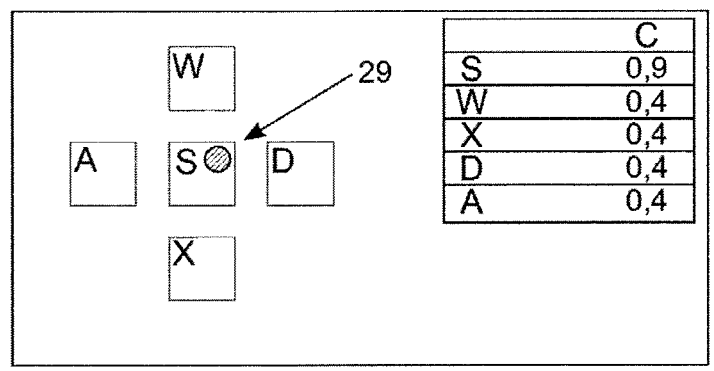
FIGS. 6b and 6c show assignments of the confidence measures during key detection.

In FIG. 6b, the highest confidence measure is assigned to the key on which the keystroke has been detected, i.e., the key S. A confidence measure which is lower but is the same for all keys is assumed for the surrounding keys A, W, D, and X. This method is advantageous since the required calculation time is short.

Figure 6C:
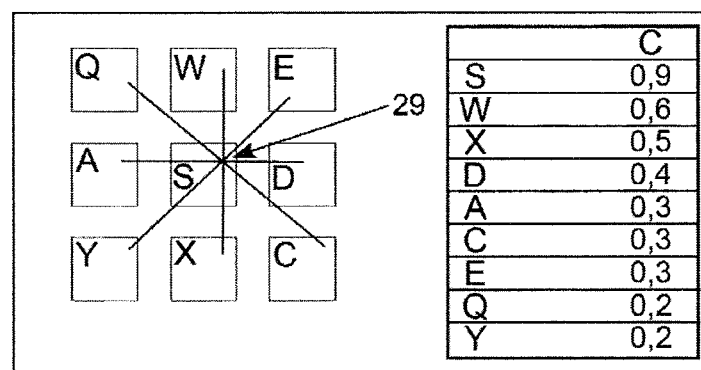

In FIG. 6c, the actual finger position when making the keystroke is detected. The corresponding scores are ascertained via the distance of the center point coordinates of the keys from the finger position. Since the keystroke 29 has taken place on the key S, the highest confidence measure is assigned to the key S here as well. The adjacent key W has the smallest distance from the finger position at the time of the keystroke. Therefore, the second-highest confidence measure is assigned to it. The confidence measure for the other surrounding keys is then ascertained in a similar manner. This method of determining the confidence measure is advantageous, since it has a very high accuracy.

Alternatively, the input may be made via a speech input. In this case, the input device 2 is designed as a microphone. Here, the results may in particular be ambiguous because there is a higher background noise level in the vehicle or the user speaks unclearly. In particular, the user input may have multiple parts. The user may, for example, pronounce individual letters, individual words, or multiple words.

These types of input detection may be combined with the methods 10 and 30 in any manner.

The input and output modalities for the user input and the system output may be ergonomically adapted to each application case. In the method, a user input via speech is suitable in particular for operation in a vehicle; however, multimodal inputs which include gestures and which are made via manual operator controls in particular are advantageous. Speech interfaces are less suitable in so-called quiet zones in which the noise level is supposed to be kept low, or for users having hearing or speech disorders. In this case, the method may still be used by providing manual user inputs. Likewise, a system output may be adapted in a multimodal manner to the circumstances.

The comparison of user inputs with database entries stored in a database is known from the technical field of search engines. Here, a user input is compared with database entries, and the relevance of each database entry is calculated by means of an algorithm, and an associated confidence measure is output which quantifies the relevance. If the search result is unambiguous, the corresponding database entry is output or a function is carried out based on it. If the search result is not unambiguous, typically, either a hit list or a system-side query is output.

Such comparisons are used, in particular, if it is assumed that recorded data are faulty, either due to incomplete or ambiguous inputs on the part of the user, or due to inaccurate recording on the system side, as is the case, for example, with speech inputs in a noisy environment or with manual inputs in an environment which is affected by vibrations. Therefore, such interactive user interfaces are increasingly used in vehicles to improve the ease of use of the numerous operating devices, for example, a navigation system, telecommunication devices, or infotainment devices.

Furthermore, care must be taken in a vehicle that the driver is not distracted from road traffic when performing an operating procedure via the user interface. Therefore, it has been proposed to make possible a multimodal user input, in which it is possible to switch among the possible input modalities to the one which is most advantageous for the user. Common input modalities include in particular inputs via speech, keyboard, touch screens, and non-contact gestures. DE 10 2008 008 948 A1 describes, for example, such a method, in which during a multi-part user input, it is possible to switch between input modalities during the input as well.

US 2009/0077464 A1 describes a method in which a word from a candidate list may be selected by touching.

Furthermore, US 2011/0202876 A1 describes a method in which an input history is created based on user inputs. The first user input is then used to output texts which are frequently entered by the user for selection.

Finally, WO 2011/113057 A1 describes a method for entering text. Suggestions are provided in response to the user inputs.

In input detection systems, the inputs made by the user are typically compared with database entries stored in a database. The relevance of each database entry with respect to the detected input is then calculated by means of an algorithm, and a level of recognition is determined, for example, in a confidence measure, which quantifies the relevance of a database entry potentially matching the input. If the search result is unambiguous, the corresponding database entry is output or carried out based on an associated function. If the search result is not unambiguous, typically, either a hit list or a system-side query is output. The user input and system output form a dialog-like schema, in particular, if a system output reacting to a user input prompts an additional user input.

It has been found to be disadvantageous that if the user makes a faulty input, the user must make a correction to the input. Since it is generally difficult to return to any arbitrary place within an input, to repeat or modify an input which has already been made, it is desirable in practice if the result desired by the user is displayed as an alternative, despite faulty inputs.

LIST OF REFERENCE NUMBERS

1 Device
2 Input device
3 Control device
4 Display device
5 Display surface
6 Database
7 Database entries, characters
8 Computing device
9 Vehicle
10 Method
11 to 18 Method steps
19 Database entries, dictionary
20.1 to 20.4 Hit lists
21.1 to 21.4 Relevant characters
22.1 to 22.4 Confidence measures
23.1 to 23.4 Overall confidence lists
24.1 to 24.4 Character combinations
25.1 to 25.4 Overall confidence measures
29 Keystroke
30 Method
31 to 39 Method steps

The invention claimed is:

1. A method for inputting and identifying a character string, the method comprising:
    detecting, with a keyboard implemented user interface located inside a vehicle, a plurality of keystrokes input into the keyboard implemented user interface in succession to form a character string including a plurality of alpha-numeric characters;
    carrying out, with a controller of the vehicle, a confidence analysis in which each keystroke of the plurality of keystrokes is compared with reference data for alpha-numeric characters stored in a database to assign a confidence value which indicates a level of confidence that an input keystroke is meant to correspond to one of the plurality of alpha-numeric characters represented on the keyboard implemented user interface, wherein the confidence value is 0, 1, or a value therebetween, wherein the confidence analysis generates a confidence value for each alpha-numeric character represented on keys of the keyboard implemented user interface, wherein each of the alpha-numeric characters for which confidence values are generated are identified as potentially relevant alpha-numeric characters;
    forming, with the controller, alpha-numeric character combinations based on the identified, potentially relevant alpha-numeric characters assigned to each of the user input keystrokes, wherein overall confidence measures for the alpha-numeric character combinations are determined based on the confidence values assigned to the potentially relevant alpha-numeric characters included in the alpha-numeric character combinations; and
    outputting, onto a display coupled to the controller, a subset of the formed alpha-numeric character combinations hierarchically as a function of the overall confidence measures, wherein the formed alpha-numeric character combinations with higher overall confidence measures are listed before alpha-numeric character combinations with lower overall confidence measures, and
    wherein the subset of output character combinations includes only formed alpha-numeric character combinations having an overall confidence value above a specified adaptable threshold value.

2. The method of claim 1, wherein the specified adaptable threshold value is selected as a function of the number of multiple user inputs.

3. The method of claim 1, wherein the overall confidence measures of the character combinations are ascertained by multiplication of the confidence values assigned to the potentially relevant alpha-numeric characters.

4. The method of claim 1, wherein the overall confidence measures of the character combinations are ascertained by averaging over the confidence values assigned to the potentially relevant alpha-numeric characters.

5. The method of claim 1, wherein
    the subset of the formed alpha-numeric character combinations is compared with database entries; and
    if no database entry is present for the formed alpha-numeric character combination having the highest overall confidence measure, this formed alpha-numeric character combination is not output, and the formed alpha-numeric character combination having the next-highest overall confidence measure, for which a database entry is present, is output first.

6. The method of claim 1, wherein the keyboard implemented user interface is a touchscreen.

7. The method of claim 1, wherein the specified, adaptable threshold value is adjusted after each time the user interface detects a user input.

8. A device for inputting and identifying a character string, the device comprising:
    a keyboard implemented user interface located inside a vehicle to detect and to input a plurality of keystrokes into the keyboard implemented user interface in succession to form a character string including a plurality of alpha-numeric characters;
    a controller of the vehicle to carry out a confidence analysis, wherein comparisons are carried out between each keystroke of the plurality of keystrokes with reference data for alpha-numeric characters stored in a database;
    wherein a confidence value is assigned which indicates a level of confidence that an input keystroke is meant to correspond to one of the plurality of alpha-numeric characters represented on the keyboard implemented user interface, wherein the confidence value is 0, 1, or a value therebetween, wherein the confidence analysis generates a confidence value for each alpha-numeric character represented on keys of the keyboard implemented user interface at a touch location or adjacent to the touched location on the keyboard implemented user interface, wherein each of the alpha-numeric characters for which confidence values are generated are identified as potentially relevant alpha-numeric characters, wherein the controller forms alpha-numeric character combinations based on the identified, potentially relevant alpha-numeric characters assigned to each keystroke;

wherein overall confidence measures for the alpha-numeric character combinations are determined based on the confidence values assigned to the potentially relevant alpha-numeric characters included in the alpha-numeric character combinations; and a display coupled to the controller, by which a subset of the formed alpha-numeric character combinations is hierarchically output onto the display as a function of the overall confidence measures, wherein the formed alpha-numeric character combinations with higher overall confidence measures are listed before alpha-numeric character combinations with lower overall confidence measures, and wherein the subset of output characters combinations includes only formed alpha-numeric character combinations having an overall confidence value above a specified adaptable threshold value.

9. The device of claim 8, wherein the specified, adaptable threshold value is selected as a function of the number of multiple user inputs.

10. The device of claim 8, wherein the specified, adaptable threshold value is adjusted after each time the user interface detects a user input.

11. The device of claim 8, wherein the keyboard implemented user interface is a touchscreen.

12. A vehicle including a device for inputting and identifying a character string, the device including:

a keyboard implemented user interface located inside the vehicle to detect and to input a plurality of keystrokes into the keyboard implemented user interface in succession to form a character string including a plurality of alpha-numeric characters;

a controller of the vehicle to carry out a confidence analysis, wherein comparisons are carried out between each keystroke of the plurality of keystrokes with reference data for alpha-numeric characters stored in a database, wherein a confidence value is assigned which indicates a level of confidence that an input keystroke is meant to correspond to one of the plurality of alpha-numeric characters represented on the keyboard implemented user interface, wherein the confidence value is 0, 1, or a value therebetween, wherein the confidence analysis generates a confidence value for each alpha-numeric character represented on keys of the keyboard implemented user interface at a touch location or adjacent to the touched location on the keyboard implemented user interface, wherein each of the alpha-numeric characters for which confidence values are generated are identified as potentially relevant alpha-numeric characters, wherein the controller forms alpha-numeric character combinations based on the identified, potentially relevant alpha-numeric characters assigned to each keystroke;

wherein overall confidence measures for the alpha-numeric character combinations are determined based on the confidence values assigned to the potentially relevant alpha-numeric characters included in the alpha-numeric character combinations; and a display coupled to the controller, by which a subset of the formed alpha-numeric character combinations is hierarchically output onto the display as a function of the overall confidence measures, wherein the formed alpha-numeric character combinations with higher overall confidence measures are listed before alpha-numeric character combinations with lower overall confidence measures, and wherein the subset of output characters combinations includes only formed alpha-numeric character combinations having an overall confidence value above a specified adaptable threshold value.

13. The vehicle of claim 12, wherein the specified, adaptable threshold value is selected as a function of the number of multiple user inputs.

14. The vehicle of claim 12, wherein the specified, adaptable threshold value is adjusted after each time the user interface detects a user input.

15. The vehicle of claim 12, wherein the keyboard implemented user interface is a touchscreen.

* * * * *